United States Patent
Decker et al.

(10) Patent No.: US 6,723,442 B1
(45) Date of Patent: Apr. 20, 2004

(54) CERAMIC MATERIAL, METHOD FOR THE PRODUCTION THEREOF, USE OF THE CERAMIC MATERIAL, AND LAYER OF THE CERAMIC MATERIAL ON A METALLIC OR CERAMIC BODY

(75) Inventors: Jens Decker, Rheinbreitbach (DE); Thomas Jansing, Nürnberg (DE); Günter Schürholt, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/019,045

(22) PCT Filed: Jun. 7, 2000

(86) PCT No.: PCT/DE00/01848

§ 371 (c)(1),
(2), (4) Date: Apr. 9, 2002

(87) PCT Pub. No.: WO01/00539

PCT Pub. Date: Jan. 4, 2001

(30) Foreign Application Priority Data

Jun. 24, 1999 (DE) .......................... 199 28 983

(51) Int. Cl.⁷ .................. B32B 15/04; C04B 35/03; C04B 35/04; C04B 35/443

(52) U.S. Cl. .............. 428/469; 428/471; 428/697; 428/699; 428/701; 428/702; 501/108; 501/112; 501/118; 501/119; 501/120; 501/121; 501/123; 501/125

(58) Field of Search .................. 428/469, 471, 428/688, 689, 697, 699, 701, 702; 501/108, 112, 118, 119, 120, 123, 125, 121

(56) References Cited

U.S. PATENT DOCUMENTS

| | | | |
|---|---|---|---|
| 3,950,504 A | | 4/1976 | Belding et al. |
| 4,400,431 A | * | 8/1983 | Henslee et al. ............. 428/402 |
| 4,780,434 A | * | 10/1988 | Watanabe et al. ........... 501/120 |
| 5,021,374 A | * | 6/1991 | Macey ........................ 501/120 |
| 5,573,987 A | | 11/1996 | Harmuth et al. |
| 6,156,687 A | * | 12/2000 | Nihonmatsu ................ 501/120 |
| 6,274,525 B1 | | 8/2001 | Zborowski et al. |
| 2002/0122967 A1 | * | 9/2002 | Gorina et al. ................ 429/30 |

FOREIGN PATENT DOCUMENTS

| | | |
|---|---|---|
| DE | 1 471 174 | 7/1963 |
| DE | 44 03 868 A1 | 2/1994 |
| DE | 44 03 868 | 2/1994 |
| DE | 198 03 327 A1 | 1/1998 |
| DE | 198 03 327 | 1/1998 |
| EP | 0 113 886 B1 | 12/1983 |
| FR | 2 114 046 | 11/1970 |
| FR | 2 286 119 | 9/1975 |

OTHER PUBLICATIONS

G. Lallemand et al.: "Fabrication Process of Spinel Powder for Plasma Spraying"; Journal of the European Ceramic Society 18 (1998) (no month), 2095–2100.

* cited by examiner

Primary Examiner—John J. Zimmerman
Assistant Examiner—G. Blackwell-Rudasill
(74) Attorney, Agent, or Firm—Harness, Dickey & Pierce, P.L.C.

(57) ABSTRACT

Disclosed is a ceramic material which is suitable for coating a body by way of a thermal spraying method and which has a coefficient of longitudinal thermal expansion that may be matched to that of a metal. The ceramic material includes 10 to 95% by weight of $MgAl_2O_4$, 5 to 90% by weight of MgO, up to 20% by weight of $Al_2O_3$, remainder standard impurities, and has grains of MgO which are embedded in a matrix of $MgAl_2O_4$.

14 Claims, 2 Drawing Sheets

CERAMIC MATERIAL, METHOD FOR THE PRODUCTION THEREOF, USE OF THE CERAMIC MATERIAL, AND LAYER OF THE CERAMIC MATERIAL ON A METALLIC OR CERAMIC BODY

This application is the national phase under 35 U.S.C. §371 of PCT International Application No. PCT/DE00/01848 which has an International filing date of Jun. 7, 2000, which designated the United States of America, the entire contents of which are hereby incorporated by reference.

FIELD OF THE INVENTION

The invention generally relates to a ceramic material for use in various coating techniques, such as for example the different variants of thermal spraying. The invention also relates to a method for producing a ceramic material of this type. Furthermore, the invention relates to a use of the ceramic material and to a layer made from the ceramic material on a metallic or ceramic body.

BACKGROUND OF THE INVENTION

Different variants of thermal spraying are flame spraying, plasma spraying, high-speed spraying, detonation spraying, and coating by way of laser or powder plasma weld surfacing. These methods are used to coat highly stressed components which are exposed to abrasive or erosive wear, corrosion, high temperatures or a very wide range of combinations of such loads. Components of this type are used, for example, in automotive engineering, in mechanical engineering, in power engineering, in chemical or petrochemical installations and numerous other sectors of the economy.

In the thermal spraying method, meltable material, such as metal or ceramic, is softened or melted by heating and is applied onto a surface which is to be coated. The heated particles of the material come into contact with the surface, on which they cool and, as a result, adhere to the surface. The heating of the material to be sprayed, including the acceleration of the heated material toward the surface, usually takes place in a spray gun for thermal spraying. The material to be heated is fed to the spray gun in powder form. The mean grain size of a powder of this type is usually between 2 $\mu$m and 150 $\mu$m.

The powder is accelerated in the spray gun by way of a gas stream. This gas is generally one of the operating gases of the spray gun, which generate the combustion or plasma flame in the spray gun. For a plasma spray gun, operating gases of this type are usually nitrogen or argon, on the one hand, and helium, on the other hand. In this case, the nitrogen or argon simultaneously serves as carrier gas for the powder.

Various ceramic materials, or materials which resemble sintered carbides, are in widespread use as coating powder for thermal spraying in engineering. A ceramic material is used in particular if the component to be coated is to be protected against corrosion or thermal influences. One example of such an application is that of protecting against wetting by metallic or oxidic melts. Particularly with components of this type, the problem arises that high mechanical stresses are generated in the ceramic coating under thermal loads. These stresses readily lead to cracks in the coating or to the coating becoming detached from the coated component. Mechanical stress occurs when the coefficient of thermal expansion of the ceramic coating material differs significantly from the coefficient of thermal expansion of the material of the component. Therefore, it is preferable to select a material for thermal spraying which has a coefficient of thermal expansion which is similar to that of the material of which the component to be coated consists.

To coat a metallic component, it is particularly appropriate to use a ceramic material whose coefficient of thermal expansion is close to that of the metal. Since metals generally have a coefficient of thermal expansion which is greater than $10*10^{-6}$/K, only a few oxides may be used for coating purposes. A preferred spraying material is zirconium oxide, which is used with a stabilizing additive of 7 to 9% by weight of yttrium oxide, for example in internal-combustion engines. The coefficient of thermal expansion of zirconium oxide layers of this type is in the region of $11*10^{-6}$/K. However, the resistance of zirconium oxide to attack from metallic or oxidic melts is lower than that of a number of other materials.

MgO has a satisfactory resistance to melts, and its coefficient of thermal expansion of $13.6*10^{-6}$/K means that it is also a suitable coating material for metals. However, MgO is not a suitable material for use in a thermal spraying process, since MgO decomposes at the high temperatures which occur in such processes, and the decomposition products are volatile.

Ceramics which are produced from a mixture of MgO and $Al_2O_3$ have good properties for use in combination with various metals. Sintered ceramics produced from MgO and $Al_2O_3$ are commercially available. They have the advantages of being highly resistant to chemical, thermal and mechanical attacks and of having a coefficient of thermal expansion which lies in the region of $11*10^{-6}$/K. However, ceramics of this type have only limited suitability as coating material, since in practice they are not suitable for coating by way of a thermal spraying method. In these ceramics too, the MgO of the ceramic evaporates at the high temperatures which occur during thermal spraying.

SUMMARY OF THE INVENTION

It is an object of the present invention to provide a stable ceramic material which is suitable for a coating operation by way of a thermal spraying method and which has a coefficient of thermal expansion which is matched to a metal.

A further object of the present invention is to provide a method for producing a material of this type. A further object of the present invention is to describe a use of the ceramic material. Furthermore, the invention has an additional object of providing a layer on a metallic body, which is able to withstand thermal loads.

The first object is achieved by a ceramic material which, according to the present invention, includes 10 to 95% by weight of $MgAl_2O_4$, 5 to 90% by weight of MgO, up to 20% by weight of $Al_2O_3$, remainder standard impurities, and which has grains of MgO with a mean diameter of 0.1 $\mu$m to 10 $\mu$m that are embedded in a matrix of $MgAl_2O_4$ in spinel form.

The present invention is based on the consideration that, unlike in a sintered ceramic including MgO and $Al_2O_3$, in which MgO and $Al_2O_3$ adjoin one another, in a compound formed from MgO and $Al_2O_3$ the evaporation of MgO during thermal spraying can be prevented or greatly restricted. An example of such a compound is $MgAl_2O_4$. This compound or ceramic has proven to be a suitable material for a thermal spraying process in a number of tests. Moreover, it is highly chemically and mechanically stable. The drawback of a ceramic of this type is its low coefficient of thermal expansion of approximately $8.5*10^{-6}$/K, which is lower than that of most metals.

Furthermore, the present invention is based on the consideration that MgO has a coefficient of thermal expansion of approximately $13.6*10^{-6}/K$. Therefore, the introduction of MgO into $MgAl_2O_4$ leads to an increase in the coefficient of thermal expansion of the ceramic material which forms. Depending on the amount of MgO added, the coefficient of thermal expansion can be set in a defined way and can be specifically matched to the coefficient of thermal expansion of the metal to be coated, or at least the difference between the coefficients of expansion can be reduced.

In a third step, the present invention is based on the consideration that the MgO has to be incorporated in the ceramic material in such a manner that it does not decompose or sublime in the hot flame of the spray gun used for thermal spraying. It is incorporated in this way if the material has areas of MgO which are embedded in a matrix of $MgAl_2O_4$. The MgO present inside such areas, which can also be referred to as grains, is surrounded by $MgAl_2O_4$. The $MgAl_2O_4$ is preferably in the form of a homogeneous matrix which does not include $MgAl_2O_4$ grains which have been sintered together with spaces between them, but rather includes homogeneous, pore-free $MgAl_2O_4$. This $MgAl_2O_4$ is sufficiently thermally stable to preserve the covering which surrounds the MgO even during the thermal spraying operation. In this way, the area of MgO remains enclosed during the thermal spraying, and the MgO cannot sublime or evaporate.

In the range between 0° C. and 1000° C., the ceramic material has a coefficient of thermal expansion of $8.5*10^{-6}/K$ to $13*10^{-6}/K$. After the ceramic material has been applied as a layer to a metallic body, for example by thermal spraying, the material has a predetermined coefficient of thermal expansion. This expansion coefficient may differ from the expansion coefficient of the material prior to the spraying. The expansion coefficient of the material of the sprayed-on layer is matched to the expansion coefficient of the metallic component which is to be coated. This matching means that, if the component is exposed to high temperature fluctuations, there are scarcely any stresses produced between coating and coated substrate. This prevents the coating from being exposed to high mechanical loads caused by temperature fluctuations and, for example, becoming detached from the substrate or forming cracks.

The present invention is able to achieve the particular advantage that the coefficient of thermal expansion of a coating produced by thermal spraying may be matched to the coefficient of thermal expansion of the coated material. This matching is effected by suitably selecting the proportion of MgO in the mixture of substances used in the ceramic material.

By matching the coefficient of thermal expansion, it is possible to achieve a specific reduction in stresses within the layer composite material formed in this way. As a result, the resistance to thermal shocks and the layer adhesion under cyclic temperature loads may be positively influenced. Furthermore, the ceramic material according to the present invention is highly resistant to aggressive melts or basic slags, such as those which are encountered in nonferrous metallurgy. Furthermore, a coating made from the material according to the invention does not undergo any relevant aging, for example through destabilization or modification changes to the structure, even under high thermal loads. A coating made from this type can scarcely be wetted by liquid aluminum or zinc. Also, on account of its white color, it has a low radiation coefficient. Moreover, a coating made from the material according to the present invention has a high electrical resistance. It is therefore also suitable as an insulator.

In an advantageous configuration of the invention, the grains of MgO embedded in a matrix of $MgAl_2O_4$ have a mean diameter of 0.1 μm to 2 μm. This grain size has a particularly advantageous effect on the sprayability of the ceramic material. The $MgAl_2O_4$ is expediently in spinel form. $MgAl_2O_4$ in a structure of this type is particularly suitable for thermal spraying and is particularly resistant to chemical and mechanical attacks.

The ceramic material advantageously contains 55 to 80% by weight of MgO. Depending on the amount of MgO, a material of this type has a coefficient of thermal expansion which is between 11.4 and $11.8*10^{-6}K^{-1}$ at 1000° C. The coefficient of thermal expansion of iron and numerous iron or steel alloys is only slightly above this range. Therefore, a material of this type is particularly suitable as a coating for such alloys.

In a further configuration of the present invention, the material additionally includes at least one oxide selected from the group consisting of CaO, $SiO_2$, $ZrO_2$ and $Fe_2O_3$. These materials, as additives, have beneficial effects on the materials properties of the material.

The second object is achieved by a method for producing a ceramic material in which, according to the present invention, MgO and $Al_2O_3$ as starting materials are melted to form a liquid phase, then the liquid phase is made to solidify by cooling, and the solidified phase is milled to form a powder of the ceramic material.

During the melting, $MgAl_2O_4$ and, if sufficient MgO is present in the starting materials, free MgO are formed. This MgO is homogeneously distributed in the liquid phase. When the liquid phase solidifies, areas in which MgO is preferentially present and which are embedded in a matrix of $MgAl_2O_4$ are formed. This method according to the present invention produces a ceramic material which has the advantages described above.

In an advantageous configuration of the present invention, the starting materials of the ceramic are melted in an arc furnace. A furnace of this type is particularly suitable for melting the ceramic starting materials.

The starting materials MgO and $Al_2O_3$ are advantageously homogeneously mixed with one another prior to the melting. This is achieved, for example, by the starting materials being introduced into a suspension and homogenized, and then being granulated, for example spray-dried. Mixing is also achieved as a result of the starting materials being present in the form of a powder and mechanically mixed.

In an expedient configuration of the present invention, 26% by weight to 96% by weight of MgO is used in the starting materials. The defined quantity of MgO added in the starting materials makes it possible to set the coefficient of thermal expansion of the ceramic material to be produced to a predetermined value. This value is between $8.5*10^{-6}/K$ and $13*10^{-6}/K$. As a result, the expansion coefficient of the material in the coating may be matched to the expansion coefficient of a metallic material which is to be coated.

A further advantage can be achieved by the fact that the material powder is formed into larger powder grains by agglomeration of the powder grains. This is achieved, for example, by adding a binder to the material powder, followed by fluidized-bed agglomeration or spray drying. The grain size of the agglomerated powder is, in the method, matched to the requirements of the particular coating technology. Therefore, it may lie in a wide range from 10 μm to 250 μm.

The object relating to use is achieved, according to the present invention, by the fact that the ceramic material as described above is used as a spray powder for thermal spraying. The material does not dissociate or dissociate only to an insignificant extent during thermal spraying. Furthermore, the material, as a result of the thermal spraying, forms a coating which adheres securely to the component to be coated and is distinguished by particular stability when exposed to thermal, chemical or mechanical attacks. It should be particularly emphasized that the coefficient of thermal expansion of a material of this type can be matched to the coefficient of thermal expansion of the material of the component to be coated by selection of the composition of the material.

The ceramic material is advantageously used as a coating in nonferrous metallurgy which is produced, for example, by thermal spraying. A coating of this type made from the material according to the invention, in particular on a part of a tool used in nonferrous metallurgy, is particularly suitable for use, for example, in a strip-galvanizing or aluminum-coating installation, for measurement sensors, blowing lance heads or for tools used for aluminum or magnesium casting.

A further advantage of the present invention is achieved by using a ceramic material as described above for coating a surface of a component of a high-temperature fuel cell by means of thermal spraying. Components of a high-temperature fuel cell, which is operated in the temperature range between 850° C. and 1000° C., are exposed to high thermal loads. Moreover, components of this type come into contact with chemically aggressive operating gases of the high-temperature fuel cell. The abovementioned advantages of the ceramic material, which are also inherent to a coating made from the material, are therefore particularly relevant in a high-temperature fuel cell.

The latter object is achieved by a layer including the ceramic material on a metallic body which has a predetermined coefficient of thermal expansion, the quantity of MgO in the ceramic material being selected in such a way that the material, after coating of the body, has the same coefficient of thermal expansion as the body.

A layer of this type does not form any stress cracks even under considerable thermal loads, on account of the matched coefficient of thermal expansion, since the stress within the layer composite workpiece formed in this way is reduced to a minimum. Consequently, the layer is able to withstand thermal shocks and adheres securely to the metallic body.

BRIEF DESCRIPTION OF THE DRAWINGS

Exemplary embodiments of the invention are explained in more detail with reference to the following tests and on the basis of two figures, in which.

In a number of tests, a ceramic material comprising approximately 68% by weight of MgO and approximately 32% by weight of $Al_2O_3$ was sprayed in a plasma flame at a temperature of up to 20,000° C. The tests showed that partial dissociation of free MgO takes place during the thermal spraying of the ceramic material. For example, in a spraying test, an evaporation rate of 5% by weight of MgO was determined during the thermal spraying. It was possible to reduce the evaporation rate to approximately 3% by weight by reducing the power of the plasma flame.

The sprayability of the ceramic material according to the present invention was examined in further tests. The tests led to the result that the material can be processed successfully as spray material for thermal spraying and leads to good spraying results. The bonding of the sprayed coating to an adhesion base below it is very good. Stress cracks cannot be detected even after the coated component has been exposed to high thermal loads. This can be attributed to the fact that the coefficient of thermal expansion of the ceramic material may be well matched to that of the component to be coated.

A number of mineral-phase analyses of the ceramic material according to the present invention have shown that free MgO is present as well as $MgAl_2O_4$ in the material prior to the thermal spraying. After thermal spraying, only MgO can be detected in the X-ray defraction diagram. This is because of the X-ray amorphous structure of the $MgAl_2O_4$ directly after spraying. $MgAl_2O_4$ may only be detected by an X-ray device after conditioning, for example for one hour at 950° C., on account of its crystal growth.

Figure 1:
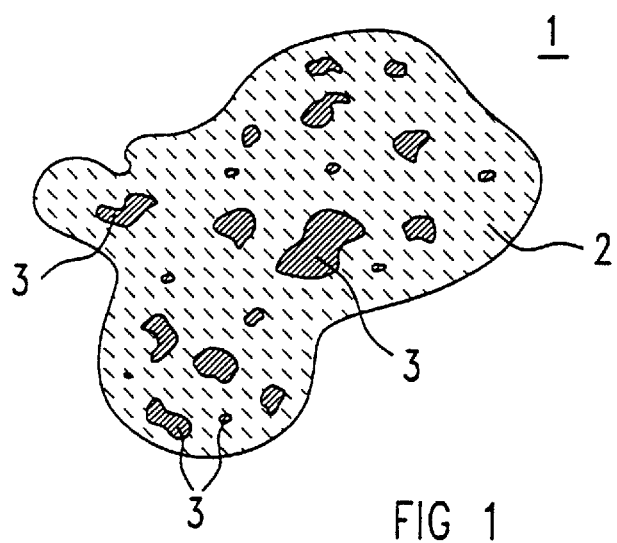
FIG. 1 shows a powder grain including a ceramic material according to the invention.

FIG. 1 shows a powder grain including a ceramic material 1 which includes 40% by weight of $MgAl_2O_4$, 58% by weight of MgO, 1% by weight of $Al_2O_3$, remainder standard impurities. A matrix 2 of $MgAl_2O_4$ in spinel form includes areas or grains 3 of MgO which is not incorporated in the spinel. The embedded grains 3 have a mean diameter of 0.5 μm.

A material 1 in powder form of this type is particularly suitable for thermal spraying. A coating produced from the material 1, for example on a metallic component, has a coefficient of thermal expansion of $11.3*10^{-6}K^{-1}$ at 1000° C. The coefficient of thermal expansion of the material 1 prior to spraying is the same, apart from a slight deviation. In the sprayed state, in which the material 1 adheres to a component as a layer, the material 1 has a structure which corresponds to that of the powder grain: grains 3 of MgO are embedded in a matrix 2 of spinel.

Figure 2:
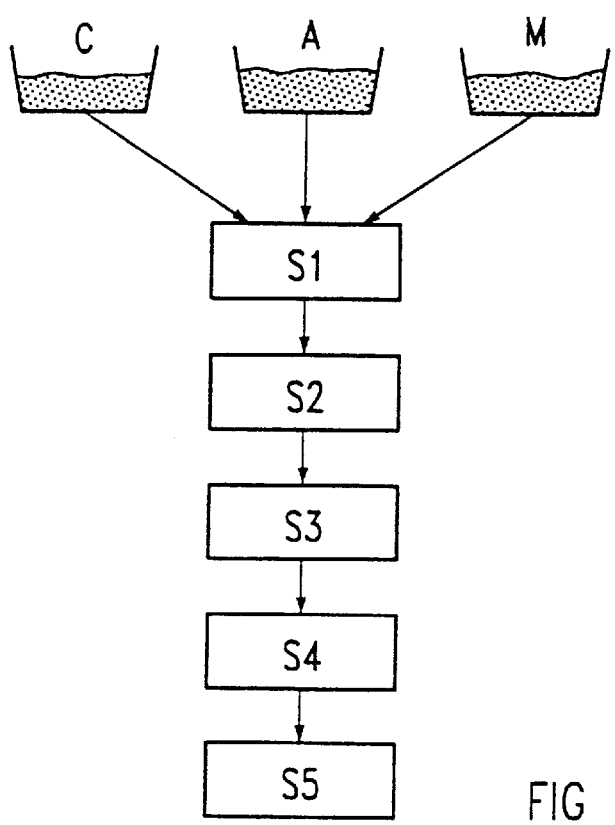
FIG. 2 shows a flow diagram of a method for producing a ceramic material.

FIG. 2 shows a flow diagram of a method for producing a ceramic material which can be sprayed using the thermal spraying method and has a coefficient of longitudinal thermal expansion of $11*10^{-6}K^{-1}$. In the first method step S1, the starting materials of the ceramic are homogeneously mixed with one another to form a mixture. The starting materials, which contain minor impurities and are denoted by C, A and M in the figure, are 0.6% by weight of CaO (C), 22.7% by weight of $Al_2O_3$ (A) and 76.5% by weight of MgO (M).

In a second method step S2, the starting materials are melted in an arc furnace. Then, the method steps S3 of cooling the melt and S4 of milling the solidified mass take place. To bring the grain size of the material powder which has formed through the milling S4 of the solidified mass to a predetermined value, the material powder is bonded to form larger grains by agglomeration in process step S5.

This method produces a powder of a ceramic material which has a predetermined coefficient of longitudinal thermal expansion of $11.5*10^{-6}K^{-1}$ at 1000° C. By varying the quantity of MgO in the starting substances, it is possible for the longitudinal expansion coefficient to be specifically matched to that of a metallic component which is to be coated with the material by a thermal spraying process.

Figure 3:
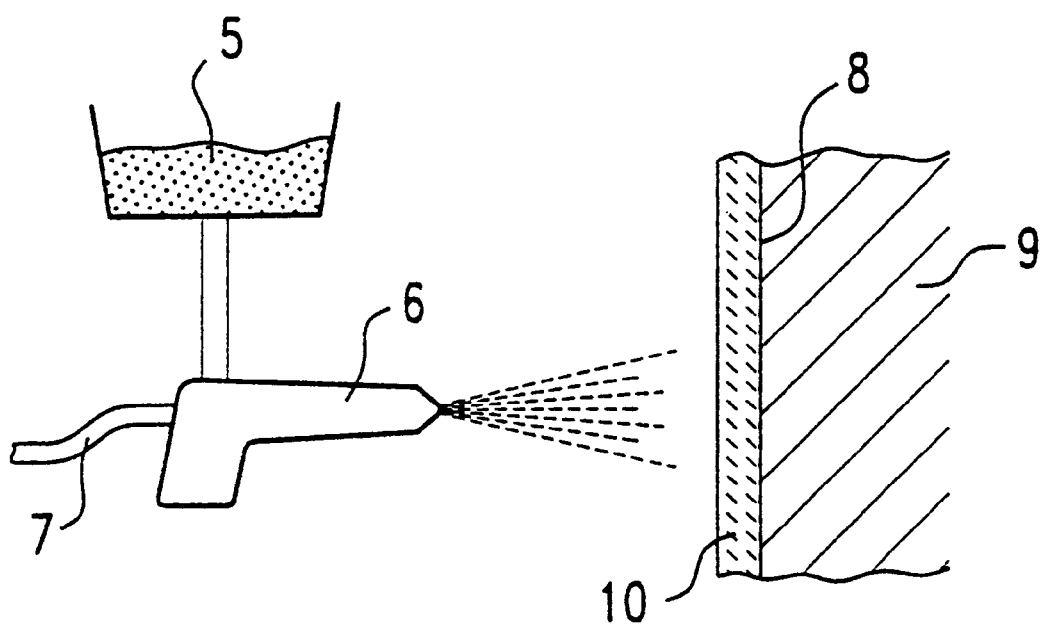
FIG. 3 shows a simplified illustration of the spraying of the ceramic material by way of a thermal spraying method.

FIG. 3 shows a greatly simplified illustration of the spraying of the ceramic material 5 by way of the flame spraying method. The ceramic material 5 is fed to the spray gun 6 in powder form. The powder of the ceramic material 5 is melted in the spray gun 6 by way of a plasma flame and is accelerated by a gas stream. The operating gas of the spray gun 6, which forms the plasma flame, is fed to the spray gun 6 through the line 7. The melted and accelerated material 5 is thrown onto the surface 8 of a metallic body 9 which is to be coated. The heated particles of the material 5 come into contact with the surface 8, cool on this surface and, as a result, adhere thereto. In this way, a layer 10 of the material 5 is formed on the body 9, which is a component of a high-temperature fuel cell. As a result of the quantity of MgO in the ceramic material 5 being selected appropriately, this layer 10 has the same coefficient of thermal expansion as the metallic body 9. It therefore adheres permanently to the metallic body 9 even when the body 9 is exposed to high thermal loads.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ceramic material, comprising:
   10 to 95% by weight of $MgAl_2O_4$;
   5 to 90% by weight of MgO;
   up to 20% by weight of $Al_2O_3$, whereby $Al_2O_3$ has an amount higher than 0 wt %; and
   remainder standard impurities,
   wherein grains of MgO, with a mean diameter of 0.1 $\mu$m to 10 $\mu$m, are embedded in a matrix of $MgAl_2O_4$ in spinel form.

2. The ceramic material as claimed in claim 1, wherein the embedded grains of MgO have a mean diameter of 0.1 $\mu$m to 2 $\mu$m.

3. The ceramic material as claimed in claim 1, comprising 55 to 80% by weight of MgO.

4. A ceramic material, comprising:
   10 to 95% by weight of $MgAl_2O_4$;
   5 to 90% by weight of MgO;
   0 to 20% by weight of $Al_2O_3$; and
   remainder standard impurities,
   wherein grains of MgO, with a mean diameter of 0.1 $\mu$m to 10 $\mu$m, are embedded in a matrix of $MgAl_2O_4$ in spinel form,
   further comprising at least one oxide selected from the group consisting of CaO, $ZrO_2$, and $Fe_2O_3$.

5. A layer, comprising:
   a ceramic material as set forth in claim 1 applied on a metallic body having a predetermined coefficient of thermal expansion, the quantity of MgO in the ceramic material being selected whereby the ceramic material, after being applied to the body, has the same coefficient of thermal expansion as the body.

6. The layer as claimed in claim 5, wherein the body is a component of a high-temperature fuel cell.

7. The ceramic material as claimed in claim 2, comprising 55 to 80% by weight of MgO.

8. The ceramic material as claimed in claim 2, further comprising at least one oxide selected from the group consisting of CaO, $SiO_2$, $ZrO_2$, and $Fe_2O_3$.

9. The ceramic material as claimed in claim 3, further comprising at least one oxide selected from the group consisting of CaO, $SiO_2$, $ZrO_2$, and $Fe_2O_3$.

10. A ceramic material, comprising:
    10 to 95% by weight of $MgAl_2O_4$, whereby $MgAl_2O_4$ forms the matrix of the ceramic material;
    5 to 90% by weight of MgO; and
    0 to 20% by weight of $Al_2O_3$.

11. The ceramic material according to claim 10, further comprising:
    remainder standard impurities.

12. The ceramic material according to claim 10, wherein grains of MgO, having a mean diameter of 0.1 $\mu$m to 10 $\mu$m, are embedded in a matrix of $MgAl_2O_4$ in spinel form.

13. A ceramic material, comprising:
    10 to 95% by weight of $MgAl_2O_4$;
    5 to 90% by weight of MgO; and
    up to 20% by weight of $Al_2O_3$, whereby $Al_2O_3$ has an amount higher than 0 wt %.

14. A ceramic material, comprising:
    10 to 95% by weight of $MgAl_2O_4$;
    5 to 90% by weight of MgO; and
    0 to 20% by weight of $Al_2O_3$, further comprising at least one oxide selected from the group consisting of CaO, $ZrO_2$, and $Fe_2O_3$.

* * * * *